United States Patent Office 3,189,526
Patented June 15, 1965

3,189,526
METHOD OF PRODUCING L-HOMOSERINE BY FERMENTATION
Shukuo Kinoshita and Hirotoshi Samejima, Tokyo, Chuzo Fujita, Hofu-shi, and Takashi Nara, Tokyo, Japan, assignors to Kyowa Hakko Kogyo Co., Ltd., Tokyo, Japan, a corporation of Japan
No Drawing. Filed Sept. 23, 1963, Ser. No. 310,936
Claims priority, application Japan, Sept. 12, 1960, 35/37,659
22 Claims. (Cl. 195—29)

This application is a continuation-in-part of application Serial No. 127,887, filed July 31, 1961, and application Serial No. 128,375, filed August 1, 1961, both of which applications are now abandoned.

The present invention relates to a method for producing L-homoserine by fermentation process. More particularly, it relates to a method for producing L-homoserine by cultivation of strains of microorganisms, which require L-threonine for their growth. The fermentation process is conducted in a culture medium properly containing a carbon source, a nitrogen source, mineral materials, and other nutrients required for the microorganism, thereby directly producing and accumulating L-homoserine in the medium.

An object of the invention is to provide a method for producing L-homoserine in moderate prices. Other objects are apparent from the following description.

L-homoserine is known to be an important metabolism intermediate in the course of biosynthesis of L-threonine and L-methionine, which are biochemically necessary amino acids. In the natural world, small amounts of L-homoserine are found in plants. In the world of microorganisms, accumulation of a slight amount of homoserine in the cell body of a strain of *Neurospora crassa*, a kind of fungus, which requires methionine, has been reported (Journal of Biological Chemistry, 190, 277 [1951]. However, the accumulation of large amounts of L-homoserine by fermentation of a microorganism in a culture medium liquor has never previously been reported, and is in fact, new.

Accordingly one aspect of this invention relates to a process wherein strains of *Micrococcus glutamicus* requiring L-threonine for their growth are cultivated. (By "threonine-requiring microorganism" the present specification means a microorganism for which threonine is the sole amino acid growth requirement.) L-homoserine is thus produced in remarkable amounts and with extremely small amounts of other amino acids being by-produced, thereby allowing the L-homoserine to be readily isolated and recovered.

The microorganisms suitable for use in the instant process are obtained by the artificial mutation of *Micrococcus glutamicus*. The bacteriological properties of *Micrococcus glutamicus* are described in Japanese Patent No. 243,382 and Bulletin of the Agricultural Chemical Society of Japan, vol. 22, No. 3, pages 176–185.

Artificial mutation may be effected in any of the known ways. *Micrococcus glutamicus* No. 534, for example, may be exposed to ultraviolet ray and/or Co–60 radiation to produce mutants which require L-threonine to sustain their growth. Examples of such mutants which constitute preferred embodiments are *Micrococcus glutamicus* No. 534–185 (ATCC 14297) and No. 534–Co–147 (ATCC 14296). These mutants, contrary to the parent strain, require L-threonine for their growth.

The discovery that these threonine-requiring strains produce remarkably large amounts of L-homoserine is unexpected. The theoretical explanation is not readily available. A biosynthetic route of threonine set forth in the following figure may offer some aid.

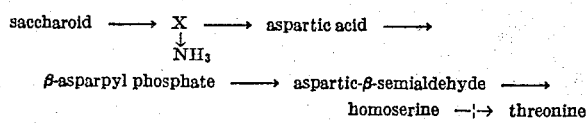

FIG. I saccharoid ⟶ X ⟶ aspartic acid ⟶
                ↓
               NH₃
β-asparpyl phosphate ⟶ aspartic-β-semialdehyde ⟶
                                  homoserine ⟶ threonine It may be that the threonine-requiring strains have some gene deficiency in the biosynthetic route from homoserine to threonine, so that L-homoserine, which is a precursor of threonine, accumulates.

As the basal medium composition to be employed for the fermentation, any of the organic and synthetic media may be employed so far as it properly contains a carbon source, a nitrogen source, mineral materials, and other nutrients as shown in the following examples. Any carbon source, nitrogen source and mineral material may be employed in the medium as long as the carbon, nitrogen and mineral, respectively, is in a form available to the strain used. As carbon source, various carbohydrate materials, such as glucose, fructose, mannose, galactose, sucrose, maltose, glycerol, mannitol, starch hydrolysate, mollasses, and the like, may be employed. Also, organic acids, such as gluconic, acetic, lactic, pyruvic, citric, aconitic, α-ketoglutaric, fumaric, malic, and oxaloacetic acids, may be employed alone or in combination with the said carbohydrate material.

Sources of available nitrogen are, e.g. ammonia and various inorganic and organic ammonium salts, such as ammonium sulfate, chloride, nitrate, phosphate, carbonate, and acetate, nitric acid salts, urea, and other nitrogen-containing materials, and hydrolysates of proteins, such as peptone NZ-amine, meat extract, yeast extract, corn steep liquor, casein, fish meal, soy bean cake, chrysalis, fermentation residue, and the like. In case of pure synthetic medium, addition of a simple organic compound, such as biotin, threonine, and the like, in an appropriate amount for growth of bacteria therein, produces accumulation of homoserine in the same degree or in greater amounts than in the case wherein a natural organic nitrogen source is used.

As mineral materials, potassium dihydrogen phosphate, potassium monohydrogen phosphate, magnesium sulfate, calcium carbonate, and the like, may be employed.

The fermentation may be effected under aerobic conditions, such as by a cultivation with shaking or with stirring by air-blowing. The cultivation temperature may be 24° to 37° C., and, particularly preferred is a temperature of 28° to 30° C. The pH tends to go below 7.0 during the cultivation, but it may be adjusted to the range between 5.0 and 8.5 by use of a suitable neutralizing agent at the commencement of, or during, the cultivation, in order to obtain a higher yield.

As the neutralizing agent, aqueous ammonia, caustic alkali, such as sodium hydroxide and potassium hydroxide, ammonim carbonate, calcium carbonate, calcium hydroxide, or others, may be used. The addition of urea is also advisable for adjustment of the pH. A remarkable amount of L-homoserine is accumulated in the basal medium after 2 to 5 days of cultivation.

After termination of the cultivation, L-homoserine can be recovered by various methods, for example, ion exchange resin treatment as illustrated in Example 2.

A separate aspect of this invention relates to the discovery that the inclusion of certain amino acids in any culture medium in which L-homoserine is being produced greatly and unexpectedly increases the yield of L-homoserine resulting therefrom. These amino acids are α-amino butyric acid an isoleucine. A material containing either of said amino acids can alternatively be employed.

The microorganism present in the culture medium is any strain which produces L-homserine in a culture medium properly containing a carbon source, a nitrogen source, mineral material and nutrient required for the growth of said microorganism. Examples of these strains are *Micrococcus glutamicus* No. 534–185 (ATCC 14297) and *Micrococcus glutamicus* No. 534–CO–185 (ATCC 14296) which are derived from *Micrococcus glutamicus* No. 534 by means of artificial mutation as previously set forth herein.

As previously set forth the amino acid used is α-amino butyric acid per se or it may be a material containing the acid, such as yeast extract, corn steep liquor, and the like; or it is isoleucine per se or a material containing the same, such as protein hydrolysate.

The addition of the α-aminobutyric acid, isoleucine or the material containing either of these acids to the culture medium may be made at any time prior to the termination of the fermentation process. For example the addition may take place at the time the medium is prepared or the amino acid may be added to the medium at the inception of the fermentation process or at any time during the process. However, better results are obtained with respect to the production of homoserine if the α-aminobutyric acid, isoleucine, or the material containing the same is added to the medium at an adequate time after the commencement of the cultivation rather than at the time of commencement of the cultivation. This addition is made at any time when an improved yield of L-homoserine is observed by the addition of the additives during the fermentation process. It is most preferable that the addition be made between 20 and 48 hours following commencement of the cultivation.

In addition the best results are obtained when the amount of the amino acid added is such that the concentration is 1–10 mg./ml.

As with the basic fermentative process, both a natural and a synthetic medium are employed for efficient production of L-homoserine when carbon, nitrogen sources and inorganic salts are added to the medium in suitable quantities. All kinds of carbon and nitrogen sources utilized by the organism are available for the culture medium.

Such carbohydrates as glucose, fructose, mannose, galactose, sucrose, maltose, glycerol, mannitol, starch hydrolysate and molasses are used as the carbon source. Furthermore, such organic acids as gluconic, acetic, lactic, pyruvic, citric, aconitic, α-ketoglutaric, fumaric, malic and oxaloacetic acid are also employed either individually or together with the above carbohydrate sources.

Inorganic nitrogenous compounds such as ammonia, $(NH_4)_2SO_4$, $NH_4Cl$, $NH_4NO_3$, ammonium phosphate and ammonium carbonate, and organic nitrogenous sources such as urea, organic ammonium salts, nitrate salts, peptone, NZ-amine, meat extract, yeast extract, corn steep liquor, hydrolystates of casein, fish mean, soybean paste and pupa and fermentation residues are employed for nitrogen sources. $K_2PO_4$, $KH_2PO_4$, $MgSO_4$ 7aq. and $CaCO_3$ are used as inorganic salts to be added to the medium.

As *Micrococcus glutamicus* require biotin and L-threonine for their growth, biotine and L-threonine should be added to a synthetic medium. There is no need to add these substances to a medium containing natural substances such as, for example, NZ-amine, meat extract and the like.

In general, a synthetic medium, wherein appropriate amounts of biotin and L-threonine are present as growth factors for the organism, gives better yields of L-homoherine than a complex medium. The synthetic and complex medium were found to give 12 mg./ml. and 7 mg./ml. of L-homoserine yields, respectively, Fermentations are usually run under aerobic conditions, by means of shaking or submerged cultivation. The fermentation is carried out at a temperature from about 24° to 37° C. although a temperature from 28° to 30° C. is preferred. The pH of the culture medium tends to become lower than 7.0 during the fermentation. If necessary, adjustment of the pH to 5.0 to 8.0, either from the beginning or during the fermentation, with such neutralizing reagents as NaOH, KOH, Ca $(OH)_2$ $(NA_4)_2CO_3$, $CaCO_3$, and urea is advisable for better results. Generally, time periods of from 70 to 120 hours give best results with no advantage being realized from longer periods of fermentation.

After the fermentation is complete, L-homoserine is isolated by standard procedures such as ion exchange methods.

The inventors have further investigated effects of various amino acids on the activity of the L-homoserine-synthetic enzyme system, and, found that two amino acids, i.e. α-amiobutyric acid and isoleucine, remarkably accelerate the activity of said enzyme system.

The accumulation of L-homoserine is increased when addition of one of the two amino acids to a culture medium is made all at once, or intermittently, at the time of commencement of, or at an adequate time during the L-homoserine fermentation.

FIG. II

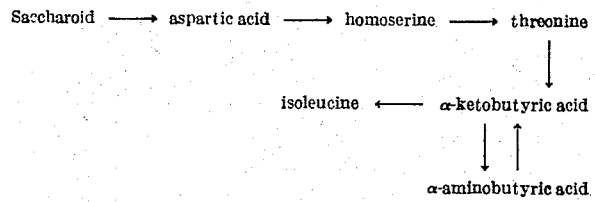

The theoretical explanation of the increase in production of L-homoserine through the use of additives is not readily available. Referring to FIG. II, the reaction from threonine to α-ketobutyric acid is irreversible (Jour. of Biological Chemistry, 181, 171 (1949). The reaction from homoserine to α-ketobutyric acid is not known. Accordingly, it is hardly possible that α-aminobutyric acid, as well as isoleucine, serve as a precursor of homoserine, and it is rather suggested that α-ketobutyric acid is possibly concerned with a central mechanism connecting each of two producing routes, i.e, biosynthesis of threonine and that of isoleucine.

To further assist in the understanding of the nature of the invention, it is noted that some microorganisms, e.g. Lactobacillus, require presence of amino acids in cultivation media for their growth, while some of them require only the presence of carbohydrates and inorganic nitrogen sources, such as ammonia, nitrate, etc. (Amino acids required are synthesized within the microorganism cells from such carbohydrates and nitrogen sources.)

Isoleucine and α-aminobutyric acid added to cultivation media in the process are not useful at all for the growth of the microorganism. Isoleucine and α-aminobutyric acid are added only for inhibiting homoserine-decomposing activity of the enzyme, homoserine-deaminase, contained in the cell of the microorganism, resulting in a significant increase in the accumulation of homoserine. (See Symposium on Amino Acid Fermentation, No. 4, pp. 65 to 73, 1961.)

In those organisms which require threonine for growth of the microorganism the amount of threonine added to the medium is *just* for growth of the microorganism. At the time when homoserine is going to be synthesized in the medium, the added threonine has been exhausted.

The following examples are given to afford a clearer understanding of the invention but are not to be construed as limiting the same:

Example 1

A seed bacteria is made by cultivation of *Micrococcus glutamicus* No. 534–Co–147 on bouillon agar slant at 28° C. for 24 hours. Twenty-five ml. portion of a basal medium is separately poured into 250 ml. volume Erlenmeyer flasks, and sterilized before the use. The basal medium for the fermentation has been prepared as follows: 100 g. of glucose, 20 g. of $(NH_4)_2SO_4$, 10 g. of NZ-amine, 5 g. of yeast extract, 1 g. of $K_2HPO_4$, and 0.3 g. of $MgSO_4 \cdot 7H_2O$ are dissolved in water to make the solution one liter, and the pH of the medium is adjusted to 8.0. After sterilization of the medium solution, 20 g. of $CaCO_3$ which has preliminarily been sterilized by dry-heating is added to one liter of the solution. A piece of the above-described seed bacteria is inoculated to the medium in the flasks, and cultivated at 28° C. under shaking.

After 72 hours cultivation, the pH of the medium decreases to 5.5, and the content of L-homoserine amounts to 6.2 mg./ml.

Example 2

The similar cultivation as in Example 1 is repeated, and cells of the bacteria are removed from the fermentation liquor. The resulting filtrate, 1 liter (pH 5.6, containing 5.6 mg./ml. of L-homoserine), is adjusted to the pH of 7.0 by use of 10 N NaOH, and passed through a resin column filled with a strongly acidic sulfonic acid-type cation exchange resin (Dia Ion SK#1) which has previously been washed with 2 N aqueous ammonia to convert to the ammonia-type, thereby L-lysine present in the largest amount in the by-produced amino acids being removed by adsorption. L-homoserine remains in the effluent unadsorbed. The effluent is adjusted to the pH of 2.2, and passed through a resin column filled with a strongly acidic sulfonic acid-type ion exchange resin (Dia Ion SK#1) which has previously been washed with 2 N HCl to convert to the free acid-type, thereby L-homoserine being adsorbed to the resin. After washing with water, the resin column is eluted with an aqueous 3.5% ammonia. Fractions which are positive in ninhydrin test are combined, and concentrated to 100 ml. volume in reduced pressure at the temperature below 50° C. to remove free ammonia. To the concentrate, 2 g. of active carbon is added for decolorization, and the carbon is filtered off. Upon addition of 100 ml. of ethyl alcohol to the filtrate, white crystalline powdered L-homoserine is isolated, which is then filtered to give 5.8 g. of primary crude crystals of L-homoserine. Upon additional 50 ml. of ethyl alcohol to the filtrate 1.1 g. of the secondary crude crystals is obtained. Both of the crude crystals are well mixed and the purity is determined by bioassay, which shows 61% purity of L-homoserine.

Example 3

One hundred grams of maltose is substituted for the glucose in the basal medium of Example 1, and the cultivation is carred out for 120 hours using the same process as in Example 1. The fermented liquor after the cultivation shows the pH of 5.6 and contains 7.35 mg./ml. of L-homoserine. The by-produced amino acids other than L-lysine are not recognized.

Example 4

The cultivation similar to Example 1 is carried out for 72 hours, except that 18 g. of peptone is substituted for the NZ-amine. The pH of the fermented liquor after the cultivation is 5.8, and the content of L-homoserine is 6.65 mg./ml.

Example 5

To a mixture of 20 g. of $(NH_4)_2SO_4$, 1 g. of $K_2HPO_4$, 0.3 g. of $MgSO_4 \cdot 7H_2O$, 0.4 g. of L-threonine, and 10 μg. of biotin, is added water to make the volume of solution 0.6 l., which is, then, adjusted to pH 8.0, and sterilized. The basal medium is prepared by addition of 20 g. of $CaCO_3$ preliminarily sterilized and 0.4 l. of aqueous glucose (100 g.) solution.

Using the above-mentioned medium and otherwise the same process as in Example 1, a cultivation is made for 120 hours. The fermentation liquor after the cultivation has the pH of 5.4, and contains 12.4 mg./ml. of L-homoserine.

Example 6

Using a strain of *Micrococcus glutamicus* No. 534–185 and otherwise the same process as in Example 1, a cultivation is carried out for 120 hours. The fermented liquor after the cultivation has the pH of 5.5, and contains 5.85 mg./ml. of L-homoserine.

Example 7

Seed bacteria are made by cultivation of *Micrococcus glutamicus* No. 534–Co–147 on bouillon agar slant at 28° C. for 24 hours. Each 25 ml. portion of a basal medium is placed in each of 250 ml. volume Erlenmeyer flasks, and sterilized prior to use. The basal fermentation medium is prepared as follows: 20 g. of $(NH_4)_2SO_4$, 0.4 g. of L-threonine, 7.5γ of biotin, 1 g. of $K_2HPO_4$, and 0.3 g. of $MgSO_4 \cdot 7H_2O$ are dissolved in water to make the volume of solution to be 1 liter. The solution is adjusted to pH 8.0 and sterilized, followed by addition of 20 g. of sterilized $CaCO_3$ and 0.4 liter of aqueous glucose (100 g.) solution. To each of the culture medium thus prepared, α-aminobutyric acid in an amount as shown in the following Table 1 is added before the cultivation.

To each of the above-said flasks containing the culture medium, are inoculated the above-said seed bacteria, and cultured under shaking at 28° C. The results of analysis after termination of the cultivation are shown in Table 1.

TABLE 1.—ANALYSIS (AFTER 125 HOURS CULTIVATION)

| Amount of DL-α-aminobutyric acid added (mg./ml.) | Amount of L-homoserine produced (mg./ml.) |
|---|---|
| 0 | 10.3 |
| 1 | 10.6 |
| 5 | 15.8 |
| 8 | 14.9 |

Example 8

Using the same seed bacteria and the same synthetic medium as in Example 1, cultivations are carried out, but α-aminobutyric acid is added intermittently during the period of fermentation. That is to say, definite amounts of α-aminobutyric acid are added to two of the media at the time of 24 and 48 hours, respectively, after the commencement of cultivation, and, thereafter, same amounts of the acid in the both cases are added thereto after every 24 hours. The fermentations are finished after total of 96 hours. The analytical results are set forth in the following Table 2.

TABLE 2.—ANALYSIS (AFTER 96 HOURS CULTIVATIONS)

| DL-α-aminobutyric acid | | Amount of L-homoserine produced (mg./ml.) |
|---|---|---|
| Time of starting addition | Amount added (mg./ml.) | |
| Added at the time of 24 hours after the commencement. | 0 | 10.88 |
| | 0.5 | 13.50 |
| | 1.2 | 15.13 |
| | 2.3 | 16.00 |
| | 3.5 | 18.60 |
| Added at the time of 48 hours after the commencement. | 0.5 | 13.25 |
| | 1.2 | 13.35 |
| | 2.3 | 15.01 |
| | 3.5 | 16.70 |

Example 9

Using the same seed bacteria and the same synthetic medium as in Example 1, two runs of cultivations are carried out, but definite amounts of DL-α-aminobutyric acid and DL-isoleucine, respectively, are added to each of the media at the time of 24 hours after the commencement of the cultivation, and the same amounts of the acids are added thereto after every 24 hours. The fermentations are finished after total of 96 hours. The analytical results are set forth in the following Table 3.

TABLE 3.—ANALYSIS (AFTER 96 HOURS CULTIVATIONS)

| Amino acid | | Amount of L-homoserine produced (mg./ml.) |
|---|---|---|
| Kind | Amount added (mg./ml.) | |
| DL-α-aminobutyric acid | 0 | 11.01 |
| | 2 | 19.38 |
| | 3 | 20.50 |
| | 4 | 17.00 |
| | 5 | 16.75 |
| | 6 | 13.16 |
| DL-isoleucine | 2 | 15.95 |
| | 3 | 18.78 |
| | 4 | 14.13 |
| | 5 | 13.20 |
| | 6 | 12.93 |

Example 10

Using *Micrococcus glutamicus* No. 534–185 and otherwise the same conditions as in Example 9, cultivations are carried out. The analytical results after the finishing of the cultivations are set forth in the following Table 4.

TABLE 4.—ANALYSIS (AFTER 96 HOURS CULTIVATIONS)

| Amino acid | | Amount of L-homoserine produced (mg./ml.) |
|---|---|---|
| Kind | Amount added (mg./ml.) | |
| DL-α-aminobutyric acid | 0 | 11.21 |
| | 2 | 19.08 |
| | 3 | 20.10 |
| DL-isoleucine | 2 | 16.21 |
| | 3 | 18.53 |

What is claimed is:

1. In the fermentative production of L-homoserine comprising culturing a microorganism in a culture medium, the improvement wherein the microorganism is a threonine-requiring strain of *Micrococcus glutamicus*.

2. A method for producing L-homoserine by fermentation which comprises (a) culturing an L-threonine requiring strain of *Micrococcus glutamicus* in a culture medium containing carbon source, nitrogen source, inorganic salt and nutrient required by the strain and (b) accumulating L-homoserine in the medium.

3. A method for producing L-homoserine by fermentation which comprises (a) culturing at a temperature of from 24° to 37° C. and at a pH of from 5.0 to 8.5 an L-threonine-requiring strain of *Micrococcus glutamicus* in a culture medium containing carbon source, nitrogen source, inorganic salt and nutrient required by the strain and (b) accumulating L-homoserine in the medium.

4. A method for producing L-homoserine by fermentation which comprises (a) culturing at a temperature of from 24° to 37° C. and at a pH of from 5.0 to 8.5 an L-threonine-requiring strain of *Micrococcus glutamicus* in a culture medium containing carbon source, nitrogen source, inorganic salt and an optimum amount of biotin and threonine and (b) accumulating L-homoserine in the medium.

5. A method for producing L-homoserine by fermentation which comprises (a) culturing *Micrococcus glutamicus* ATCC No. 14296 at a temperature of from 24° to 37° C. and at a pH of from 5.0 to 8.5 in a culture medium containing carbon source, nitrogen source, inorganic salt and nutrient required by the strain and (b) accumulating L-homoserine in the medium.

6. A method for producing L-homoserine by fermentation which comprises (a) culturing *Micrococcus glutamicus* ATCC No. 14297 at a temperature of from 24° to 37° C. and at a pH of from 5.0 to 8.5 in a culture medium containing carbon source, nitrogen source, inorganic salt and nutrient required by the strain and (b) accumulating L-homoserine in the medium.

7. In the production of L-homoserine in a culture medium by fermentation, the improvement which comprises culturing a threonine-requiring strain of *Micrococcus glutamicus* and incorporating in the culture medium a member selected from the group consisting of α-aminobutyric acid or isoleucine prior to the termination of the fermentation.

8. The method of accelerating the fermentative production of L-homoserine in culturing a microorganism in a culture medium which comprises culturing a threonine-requiring strain of *Micrococcus glutamicus* and carrying out at least part of the fermentation in the presence of yeast extract.

9. The method of accelerating the microbiological production of L-homoserine in a culture medium which comprises culturing a threonine-requiring strain of *Micrococcus glutamicus* and having α-aminobutyric acid incorporated in the culture medium.

10. The method of accelerating the microbiological production of L-homoserine in a culture medium which comprises culturing a threonine-requiring strain of *Micrococcus glutamicus* and having isoleucine incorporated in the culture medium.

11. In the microbiological production of L-homoserine in a culture medium, the improvement wherein a threonine-requiring strain of *Micrococcus glutamicus* is employed and the culture medium contains corn steep liquor.

12. In the microbiological production of L-homoserine in a culture medium, the improvement wherein a threonine-requiring strain of *Micrococcus glutamicus* is employed and the culture medium contains protein hydrolysate.

13. In the fermentative production of L-homoserine wherein a microorganism is cultured in a culture medium, the improvement wherein the microorganism is a strain of *Micrococcus glutamicus* requiring threonine for its growth, and a member selected from the group consisting of α-aminobutyric acid, a material containing α-aminobutyric acid, isoleucine, and a material containing isoleucine is added to the culture medium before the finish of the fermentaiton.

14. In the fermentative production of L-homoserine wherein a microorganism is cultured in a culture medium, the improvement wherein the microorganism is a strain of *Micrococcus glutamicus* requiring threonine for its growth, and a member selected from the group consisting of α-aminobutyric acid, a material containing α-aminobutyric acid, isoleucine, and a material containing isoleucine is added to the culture medium within a period from about 20 hours to about 48 hours after the commencement of the fermentation.

15. In the fermentative production of L-homoserine wherein a microorganism is cultured in a culture medium, the improvement wherein the microorganism is a strain of *Micrococcus glutamicus* requiring threonine for its growth, and a member selected from the group consisting of α-aminobutyric acid, a material containing α-aminobutyric acid, isoleucine, and a material containing isoleucine is added to the culture medium at the commencement of the fermentation.

16. In the fermentative production of L-homoserine wherein a microorganism is cultured in a culture medium, the improvement wherein the microorganism is a strain of *Micrococcus glutamicus* requiring threonine for its growth, and a member selected from the group consisting of α-aminobutyric acid, a material containing α-aminobutyric acid, isoleucine, and a material containing isoleucine is added before the finsh of the fermentation to the culture medium in an amount which provides a concentration therein of added amino acid of from 1 to 10 mg./ml.

17. In the fermentative production of L-homoserine comprising culturing a microorganism in a culture medium, the improvement wherein the microorganism is a threonine-requiring strain of *Micrococcus glutamicus* and the culture medium contains α-aminobutyric acid.

18. In the fermentative production of L-homoserine comprising culturing a microorganism in a culture medium, the improvement wherein the microorganism is a threonine-requiring strain of *Micrococcus glutamicus* and the culture medium contains isoleucine.

19. In the fermentative production of L-homoserine wherein a microorganism is cultured in a culture medium, the improvement wherein the microorganism is *Micrococcus glutamicus* No. 534–Co–147, (ATCC No. 14296), and a member selected from the group consisting of α-aminobutyric acid, a material containing α-aminobutyric acid, isoleucine, and a material containing isoleucine is added to the culture medium before the finish of the fermentation.

20. In the fermentative production of L-homoserine wherein a microorganism is cultured in a culture medium, the improvement wherein the microorganism is *Micrococcus glutamicus* No. 534–185 (ATCC No. 14297), and a member selected from the group consisting of α-aminobutyric acid, a material containing α-aminobutyric acid, isoleucine, and a material containing isoleucine is added to the culture medium before the finish of the fermentation.

21. In the fermentative production of L-homoserine comprising culturing a microorganism in a culture medium, the improvement wherein the microorganism is *Micrococcus glutamicus* ATCC No. 14296 in a culture medium containing an optimum amount of a member selected from the group consisting of biotin and biotin analogues having biotin activity.

22. In the fermentation production of L-homoserine comprising culturing a microorganism in a culture medium, the improvement wherein the microorganism is *Micrococcus glutamicus* ATCC No. 14297 in a culture medium containing an optimum amount of a member selected from the group consisting of biotin and biotin analogues having biotin activity.

References Cited by the Examiner

Porter: Bacterial Chemistry and Physiology, John Wiley & Sons, Inc., New York, 1946, pp. 707 and 764–767.

Meister: Biochemistry of the Amino Acids, 1957, pp. 279–280, Academic Press Inc., New York.

Hirsch et al.: Compt. red. 236, 233–40 (1953), abstracted in C.A. 47 10613a.

Nisman et al.: Compt. rend. 238, 1342–44 (1944), abstracted in C.A., 48, 8314e.

Black et al.: Chemical Abstracts, vol. 49, pp. 8389i.

A. LOUIS MONACELL, *Primary Examiner.*